(12) United States Patent
Zeng (10) Patent No.: US 7,898,472 B2
(45) Date of Patent: Mar. 1, 2011

(54) METHOD AND APPARATUS FOR PRECISE RELATIVE POSITIONING IN MULTIPLE VEHICLES

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 12/412,672

(22) Filed: Mar. 27, 2009

(65) Prior Publication Data

US 2010/0245171 A1 Sep. 30, 2010

(51) Int. Cl.
*G01S 19/51* (2010.01)

(52) U.S. Cl. .................. 342/357.34; 342/451; 342/458
(58) Field of Classification Search ............ 342/357.34, 342/451, 458
See application file for complete search history.

(56) References Cited

U.S. PATENT DOCUMENTS

| | | | | | |
|---|---|---|---|---|---|
| 5,252,982 | A | * | 10/1993 | Frei | 342/357.03 |
| 5,323,163 | A | * | 6/1994 | Maki | 342/357.15 |
| 6,014,101 | A | * | 1/2000 | Loomis | 342/357.02 |
| 6,057,800 | A | * | 5/2000 | Yang et al. | 342/357.08 |
| 7,084,809 | B2 | * | 8/2006 | Hockley et al. | 342/357.08 |

* cited by examiner

*Primary Examiner*—Thomas H Tarcza
*Assistant Examiner*—Cassi Galt
(74) *Attorney, Agent, or Firm*—John A. Miller; Miller IP Group, PLC (57) ABSTRACT

A system and method for determining the position and velocity of a plurality of vehicles relative to a host vehicle using GPS data. The method includes building a graph of the vehicles that define weighted baselines between each of the vehicles and the host vehicle and each of the vehicles where the weighted baselines define a geometric dilution of precision between the vehicles. The method then determines the optimal baseline between the host vehicle and each of the other vehicles using the weighted baselines based on the lowest geometric dilution of precision. The method then computes the relative position and velocity between all of the vehicles and the host vehicle using the optimal baselines.

20 Claims, 8 Drawing Sheets

METHOD AND APPARATUS FOR PRECISE RELATIVE POSITIONING IN MULTIPLE VEHICLES

BACKGROUND OF THE INVENTION

1. Field of the Invention

This invention relates generally to a system and method for determining the position and velocity of a plurality of vehicles relative to a host vehicle and, more particularly, to a system and method for determining the position and velocity of a plurality of vehicles relative to a host vehicle using GPS signals, where the system calculates optimal baselines between the vehicles.

2. Discussion of the Related Art

Short-baseline precise relative positioning of multiple vehicles has numerous civilian applications. By using relative GPS signals in real-time, a vehicle can establish a sub-decimeter level accuracy of relative positions and velocities of surrounding vehicles (vehicle-to-vehicle object map) that are equipped with a GPS receiver and a data communication channel, such as a dedicated short range communications (DSRC) channel. This cooperative safety system can provide position and velocity information in the same way as a radar system.

For precise relative positioning, a vehicle needs to broadcast its raw GPS data, such as code range, carrier phase and Doppler measurements. The bandwidth required to do this will be an issue in a crowded traffic scenario where a large number of vehicles are involved.

Data format defined in The Radio Technical Commission for Maritime Service Special Committee 104 (RTCM SC104) contains unwanted redundancy. For example, message type #1 (L1C/A code phase correction) uniformly quantizes corrections with a 0.02 meter resolution. The pseudo-range measurements are thus represented in a range of $\pm 0.2 \times 2^{15}$ meters. However, the pseudo-range measurements are generally limited to about ±15 meters. It is thus noted that excess bandwidth wastage occurs if the RTCM protocol is directly used in a cooperative safety system.

SUMMARY OF THE INVENTION

In accordance with the teachings of the present invention, a system and method are disclosed for determining the position and velocity of a plurality of vehicles relative to a host vehicle using GPS information. The method includes building a graph of the vehicles that define weighted baselines between each of the vehicles and the host vehicle and each of the vehicles where the weighted baselines define a geometric dilution of precision between the vehicles. The method then determines the optimal baseline having the lowest geometric dilution of precision between the host vehicle and each of the other vehicles using the weighted baselines based on the geometric dilution of precision. The method then computes the relative position and velocity between all of the vehicles and the host vehicle using the optimal baselines.

Additional features of the present invention will become apparent from the following description and appended claims, taken in conjunction with the accompanying drawings.

BRIEF DESCRIPTION OF THE DRAWINGS

FIG. 5($a$) is a diagram of a graph showing a vehicle host node and other vehicle nodes with baselines relative thereto;

FIG. 5($b$) shows an optimal-spanning tree including a host node and other vehicle nodes with optimal baselines therebetween;

DETAILED DESCRIPTION OF THE EMBODIMENTS

The following discussion of the embodiments of the invention directed to a system and method for determining the position and velocity of a plurality of vehicles relative to a host vehicle using GPS signals and optimal-spanning tree analysis is merely exemplary in nature, and is in no way intended to limit the invention or it's applications or uses.

Figure 1:
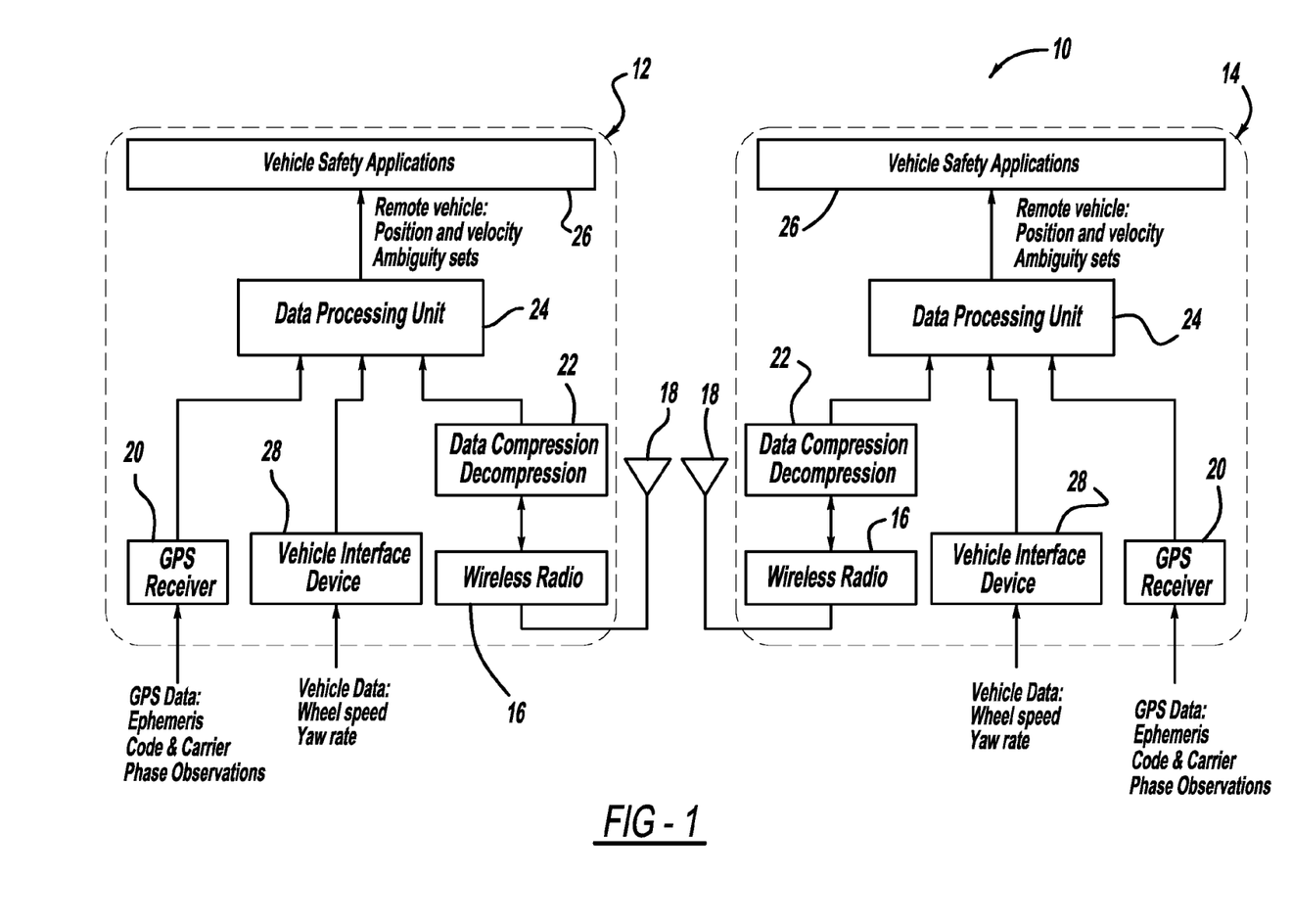
FIG. 1 is a block diagram of a system communications architecture for a host vehicle and a remote vehicle.

FIG. 1 illustrates a communications architecture 10 for a host vehicle 12 and a remote vehicle 14. The host vehicle 12 and the remote vehicle 14 are each equipped with a wireless radio 16 that includes a transmitter and a receiver (or transceiver) for broadcasting and receiving wireless packets through an antenna 18. Each vehicle includes a GPS receiver 20 that receives satellite ephemeris, code range, carrier phase and Doppler frequency shift observations. Each vehicle also includes a data compression and decompression unit 22 for reducing the communication bandwidth requirement. Each vehicle also includes a data processing unit 24 for constructing a vehicle-to-vehicle (V2V) object map. The constructed V2V object map is used by vehicle safety applications 26. The architecture 10 may further include a vehicle interface device 28 for collecting information including, but not limited to, vehicle speed and yaw rate.

Figure 2:
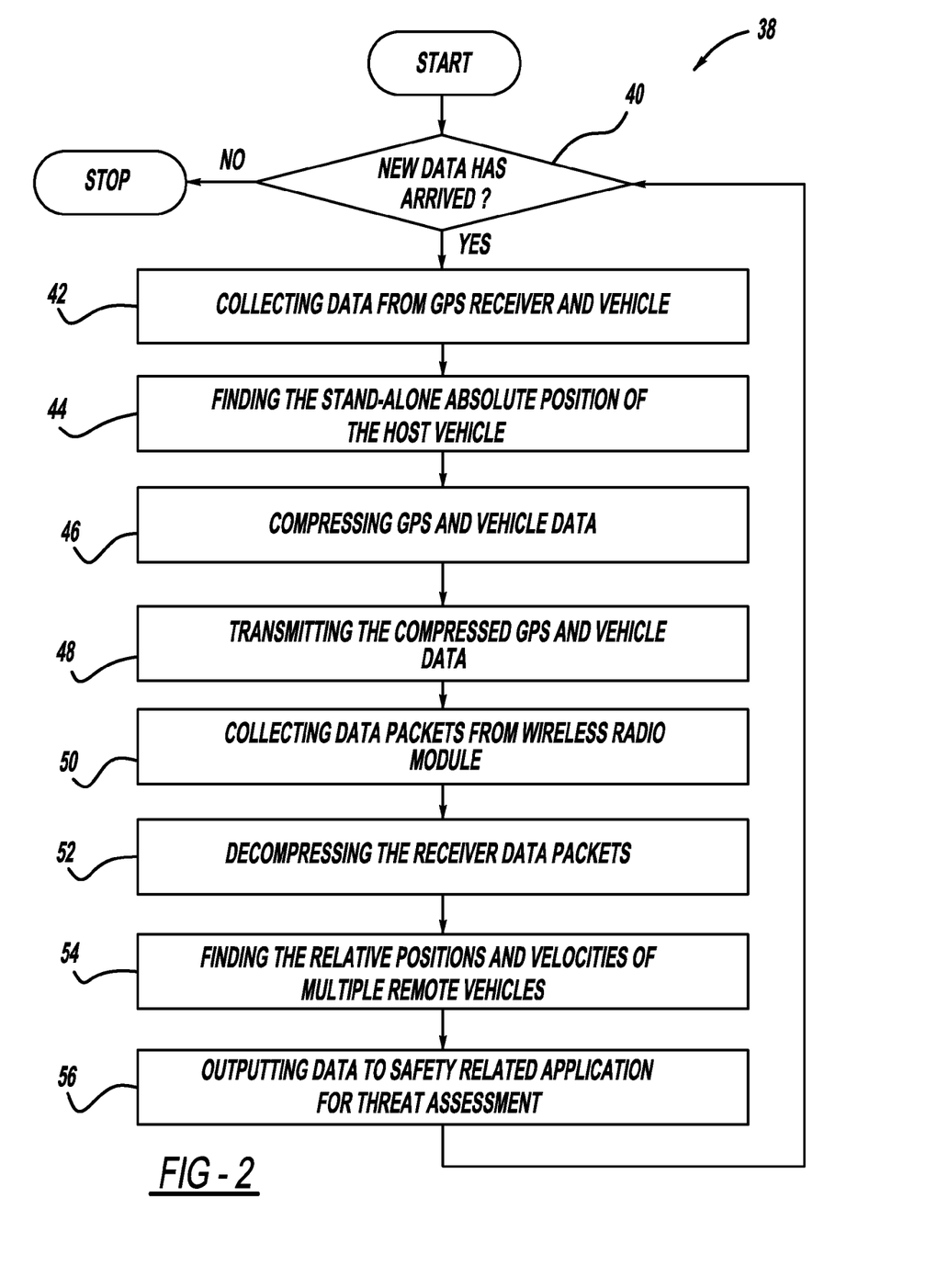
FIG. 2 is a flow chart diagram showing the operation of a processing unit in the architecture shown in FIG. 1.

FIG. 2 is a flowchart diagram 38 showing the operation of the processing unit 24 in the architecture 10. The processing unit 24 is triggered once new data is received at decision diamond 40. A first step collects the ephemeris of the satellites, i.e., orbital parameters of the satellites at a specific time, code range (pseudo-range), carrier phase observations, and vehicle data of the host vehicle 12 at box 42. A second step determines the position and velocity of the host vehicle 12 that serve as the moving reference for the later precise relative positioning method at box 44. A third step compresses the GPS and vehicle data at box 46. A fourth step broadcasts the GPS and vehicle data at box 48. A fifth step collects wireless data packets from remote vehicles at box 50. A sixth step decompresses the received data packets and derives the GPS and vehicle data of each remote vehicle at box 52. A seventh step constructs a V2V object map using the precise relative positioning method at box 54. A eighth step outputs the V2V object map to the high-level safety applications for their threat assessment algorithms at box 56.

The data processing unit 24 can be further described as follows. Let $X_1, X_2, \ldots, X_K$ be K vehicles. Let $X_i$ be the state of the i-th vehicle, including the position and velocity in Earth-centered and Earth-fixed coordinates (ECEF). Let $X_H$ be the state of the host vehicle 12, where $1 \leq H \leq K$. Let X be the states of the satellite, including the position and velocity in ECEF coordinates, which can be determined by the ephemeris messages broadcast by the j-th satellite.

Figure 3:
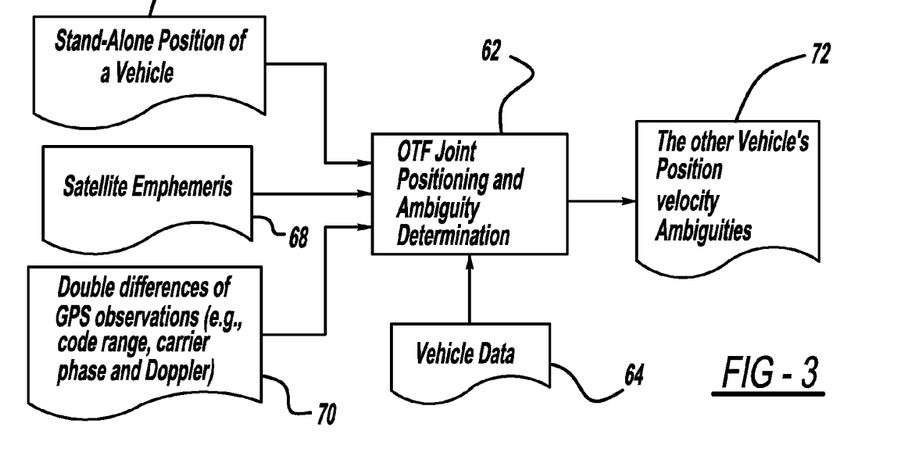
FIG. 3 is a block diagram showing a process for solving a relative position and velocity vector between vehicles.

FIG. 3 illustrates a flow chart diagram 60 for precisely solving the relative position and velocity vector between the vehicles. The diagram 60 includes an on-the-fly (OTF) joint positioning and ambiguity determination module 62 that receives information from various sources, including vehicle data at box 64, stand-alone position of a vehicle at box 66, satellite ephemeris at box 68 and double differences of GPS observations at box 70, discussed below. The module 62 outputs the other vehicle's position velocity and ambiguities at box 72. It is noted that the absolute coordinates of one vehicle are required. In a system that only contains moving vehicles, the coordinates of the moving reference are simply estimated using a stand-alone positioning module to supply the approximate coordinates of the reference base coordinates.

Double differential carrier phase measurements for short baselines are used to achieve a high positioning accuracy. Carrier phase measurements are preferred to code measurements because they can be measured to better than $0.01\lambda$, where $\lambda$ is the wavelength of the carrier signal, which corresponds to millimeter precision and are less affected by multipath than their code counterparts. However, carrier phase is ambiguous by an integer of the number of cycles that has to be determined during the vehicle operation.

Let the host vehicle $X_h$ be the moving reference station. Let $b_{ih}$ be a baseline between the host vehicle $X_h$ and the remote vehicle $X_i$. The following double-difference measurements of carrier phase, code and Doppler measurements can be written as:

$$d = H(X_H, b_{ih}) b_{ih} + \lambda N + v_{ih} \qquad (1)$$

Where $H(X_H, b_{ih})$ is the measurement matrix depending on the moving host vehicle $X_H$ and the baseline $b_{ih}$, $\lambda$ is the wavelength of the carrier, N is the vector of the double-difference of ambiguities and $v_{ih}$ is the unmodelled measurement noise. Without loss of generality, it is assumed that equation (1) is normalized, i.e., the covariance matrix of $v_{ih}$ is an identity matrix.

The heart of the flow chart diagram 60 is the on-the-fly (OTF) joint positioning and ambiguity determination module 62. In the module 62, a (6+J−1)-dimension state tracking filter is employed to estimate the three position and the three velocity components, as well as J−1 float double-difference of ambiguities as:

$$d = \tilde{H}(X_H, b_{ih}) s + v_{ih} \qquad (2)$$

Where $\tilde{H}(X_H, b_{ih})$ is the extension of $H(X_H, b_{ih})$ and the joint state $$s = \begin{bmatrix} N \\ b_{ih} \end{bmatrix}.$$

Note that the matrix $\tilde{H}(X_H, b_{ih})$ is not very sensitive to changes in the host vehicle $X_h$ and the baseline $b_{ih}$. With the process equation of the baseline available, it is usually sufficient to use the host vehicle $X_H$ and the predicted estimate $\tilde{b}_{ih}$ of the previous time instant. Therefore, when the value d is available, a better estimate of the baseline $b_{ih}$ can be obtained by the filtering described below.

Let the process equation of the baseline $b_{ih}$ be:

$$b_{ih}(t+1) = f(b_{ih}(t)) + w \qquad (3)$$

Where w denotes un-modeled noise.

In equation (3), $f$ is the function that expresses the dynamical model of the baseline. Some candidates of the dynamical model are a constant velocity model (CV) or a constant turning model (CT). Linearizing equation (3) in the neighborhood of the prediction of the baseline $\tilde{b}_{ih}$ of the previous cycle and including the double-difference of ambiguities N gives:

$$s(t+1) = \begin{bmatrix} I & 0 \\ 0 & F \end{bmatrix} s(t) + \begin{bmatrix} 0 \\ u \end{bmatrix} + \begin{bmatrix} 0 \\ I \end{bmatrix} w \qquad (4)$$

Where I is an identity matrix $$s(t+1) = \begin{bmatrix} N \\ b_{ih}(t+1) \end{bmatrix},$$

$$s(t) = \begin{bmatrix} N \\ b_{ih}(t) \end{bmatrix}$$

and $u = f(\tilde{b}_{ih}) - F \tilde{b}_{ih}$.

Now the OTF joint filtering procedure can be written in Algorithm 1, described below.

In equation (1), the measurement matrix $H(X_H, b_{ih})$ plays an important role for the above single baseline positioning method to converge to the correct solution. A geometric dilution of precision (GDOP), i.e., $[H(X_H, b_{ih})]^{-1}$, affects the quality of the estimate of the baseline $b_{ih}$. It can be verified that the GDOP depends on the number of shared satellites and the constellation of the common satellites for the baseline $b_{ih}$. For example, when visible shared common satellites between the remote vehicle and the host vehicle are close together in the sky, the geometry is weak and the GDOP value is high. When the visible shared common satellites between the remote vehicle and the host vehicle are far apart, the geometry is strong and the GDOP value is low. Thus, a low GDOP value represents a better baseline accuracy due to the wider angular separation between the satellites. An extreme case is that the GDOP is infinitely large when the number of shared satellites is less than four.

Figure 4:
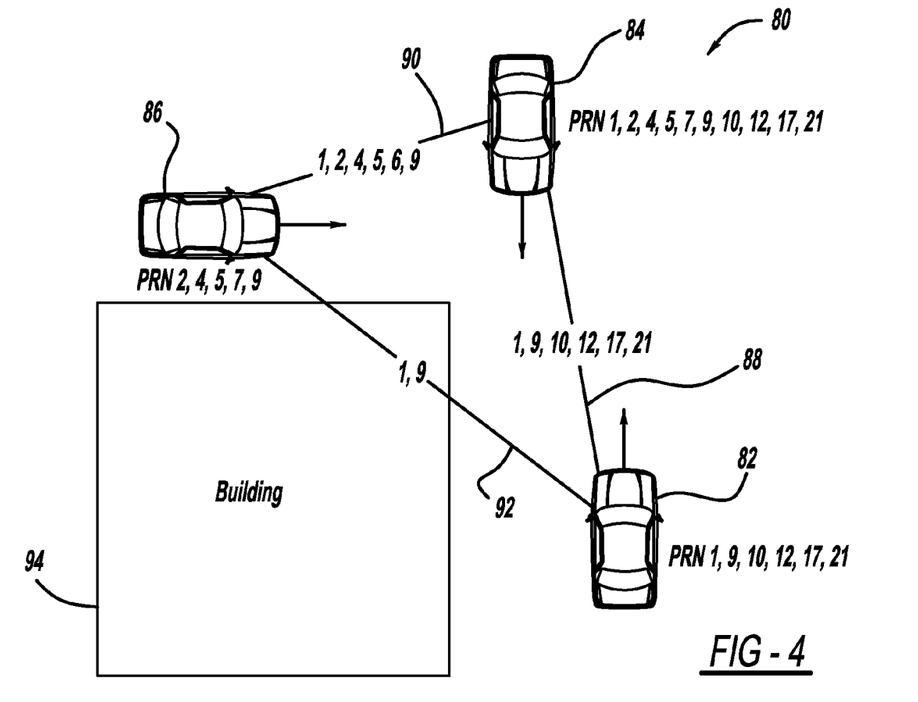
FIG. 4 is an illustration of the relative position between vehicles and satellites.

FIG. 4 is a diagram of vehicles 82, 84 and 86, where the vehicle 82 is a host vehicle, used to illustrate the discussion above. A baseline 88 ($b_{AB}$) is defined between the vehicles 82 and 84, a baseline 90 ($b_{BC}$) is defined between the vehicles 84 and 86 and a baseline 92 ($b_{AC}$) is defined between the vehicles 82 and 86. A building 94 is positioned between the vehicles 82 and 86, and operates to block signals of certain satellites so that the vehicles 82 and 86 only receive signals from a few of the same satellites. Particularly, the vehicle 82 receives signals from satellites 1, 9, 10, 12, 17 and 21, the vehicle 84 receives signals from satellites 1, 2, 4, 5, 7, 9, 10, 12, 17 and 21 and the vehicle 86 receives signals from the satellites 1, 2, 4, 5, 7, and 9. Thus, the vehicles 84 and 86 receive signals from common satellites 1, 2, 4, 5, 6, and 9 and the vehicles 82 and 84 only receive signals from common satellites 1 and 9. Therefore, the vehicles 82 and 86 do not receive signals from enough common satellites to obtain the relative position and velocity because it takes a minimum of four satellites.

It is noted that there is more than one solution for positioning among multiple vehicles. Consider the scenario shown in FIG. 4 where the host vehicle 82 needs to estimate the relative positions and velocities of the vehicles 84 and 86, i.e., the baselines $b_{AB}$ and $b_{AC}$, respectively. The baseline $b_{AC}$ can be estimated either directly using the single baseline positioning method or can be derived by combining two other baseline estimates as:

$$b_{AC} = b_{AB} + b_{BC} \quad (5)$$

Similarly the baseline $b_{AB}$ has two solutions. It can be verified that the qualities of the two solutions are different. The goal is to find the best solution. As shown in FIG. 4, due to the blockage caused by the building 94, the quality of the estimate of the baseline $b_{AC}$ is degraded because less than four shared satellites (PRN 1, 9) are observed. On the other hand, the baseline $b_{AC}$ inferred from the baselines $b_{AB}$ and $b_{BC}$ is better than the direct estimate of the baseline $b_{AC}$.

The concept from FIG. 4 can be generalized by introducing a graph G with the vertices denoting the vehicles and edges denoting the baselines between two vertices. Let the weights of the edges be the GDOP of the baseline between two vehicles. The goal is to find a spanning tree, i.e., a selection of edges of G that form a tree spanning for every vertex, with the host vehicle assigned as the root so that the paths from the root to all other vertices have the minimum GDOP.

Figure 5A:
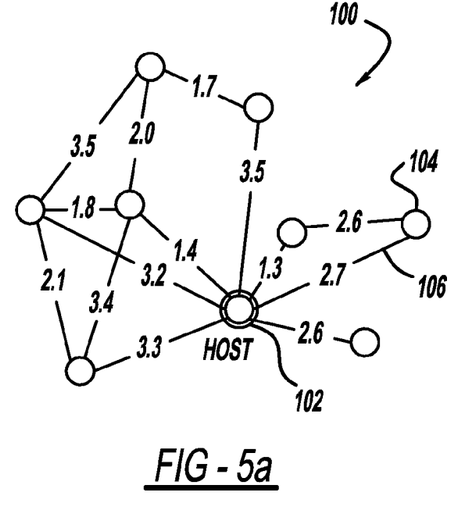
Figure 5B:
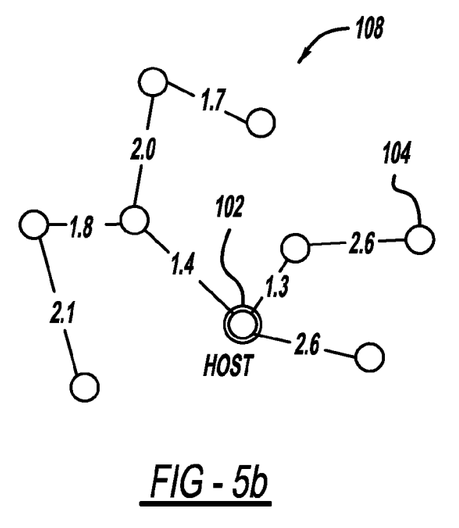

FIG. 5(a) is a diagram of such a weighted graph 100 showing the host vehicle at node 102 and the other vehicles at nodes 104, where an edge or baseline 106 between the host node 102 and the nodes 104 and between the other nodes 104 is giving a weight determined by a suitable GDOP algorithm. FIG. 5(b) shows an optimal-spanning tree 108 with the non-optimal edges or baselines removed.

Figure 6:
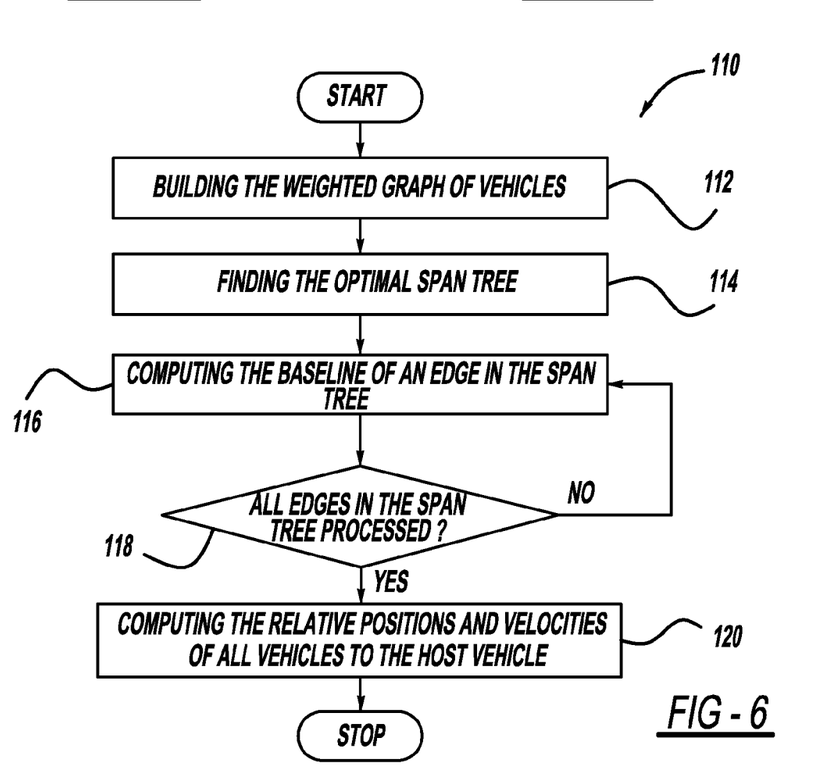
FIG. 6 is a flow chart diagram showing a process for multi-vehicle precise relative positioning.

FIG. 6 is a flow chart diagram 110 showing a process for defining the weighted graph 100 shown in FIG. 5(a) and the optimal-spanning tree 108 shown in FIG. 5(b). The flow chart diagram 110 includes steps of building the weighted graph 100 of nodes at box 112 and then finding the optimal span of the graph 100 at box 114. The algorithm then computes the baseline of an edge in the graph 100 at box 114, and determines whether all of the edges in the span of the graph 100 are processed at decision diamond 118, and if not, returns to the box 116 to compute the next baseline. The algorithm then computes the relative positions and velocities of all of the vehicles relative to the host vehicle at box 120.

The step of computing the baselines to obtain the minimum GDOP in the flow diagram 110 can be performed any algorithm suitable for the purposes described herein. A first algorithm, referred to as Algorithm 1, is based on a single baseline precision positioning. Given the previous estimate of the joint state $\hat{s}(t-1)$ with its covariance matrix $\hat{P}(t-1)$; double difference d; GPS time stamp of the receiver $t_R$; satellite ephemeris E; the system dynamical of equation (1); the measurement equation (2); the covariance matrix Q of the noise term w in equation (3); and the covariance matrix R of the noise term v in equation (2).

The updated estimate of the joint state $\hat{s}(t)$ and the covariance matrix $\hat{P}(t)$ at time t can be solved as follows:

1. Compute the prediction $\tilde{s}$ using equation (1) as:

$$\tilde{s} = \begin{bmatrix} I & 0 \\ 0 & F \end{bmatrix} \hat{s}(t-1) + \begin{bmatrix} 0 \\ u \end{bmatrix}$$

and $$\tilde{P} = \begin{bmatrix} I & 0 \\ 0 & F \end{bmatrix} \hat{P}(t-1) \begin{bmatrix} I & 0 \\ 0 & F \end{bmatrix}^T + \begin{bmatrix} 0 \\ I \end{bmatrix} Q \begin{bmatrix} 0 \\ I \end{bmatrix}^T$$

2. Compute the innovation error as:

$$e = d - \tilde{H}(\tilde{s})$$

With $\tilde{H} = \tilde{H}(X_h, b_{ih})$

3. Compute innovation covariance $S = \tilde{H}\tilde{P}\tilde{H}^T + R$.
4. Compute Kalman gain as $K = \tilde{P}\tilde{H}^T S^{-1}$.
5. Output the updated estimate $\hat{s} = \tilde{s} + Ke$ and the covariance matrix $\hat{P} = (I - K\tilde{H})\tilde{P}$.

The precise relative positioning for multiple vehicles can also be determined by the following algorithm, referred to as Algorithm 2.

1. Build a weighted graph G of vehicles where each vehicle is a vertex and adding an edge between two vertices if the number of shared observed satellites is larger or equal to four. Let the root denote the host vehicle.
2. The weight of an edge is equal to the geometric dilution of precision (GDOP) of the common satellites observed by the two vehicles, i.e., $\det[H(X_i, b_{ik})]^{-1}$ in equation (1) for the weight of the edge between the vertices i and j.
3. Use dynamic programming (either revised Bellman-Ford algorithm of Algorithm 3 or Dijkstra algorithm of Algorithm 4) to find a spanning tree such that the path from any other nodes has the best satellite geometry (minimum GDOP) for positioning.
4. For all E in the graph G do
5. Determine the baseline as represented by the edge E by the algorithms described in Algorithm 1.
6. end for
7. Compute relative positions and velocities from the vehicles to the host vehicle based on the graph G.

Algorithm 3 is a Reversed Bellman-Ford Algorithm

Given the graph G with the vertices $V = \{v_i | 1 \leq i \leq |V|\}$, the edges $E = \{e_k | 1 \leq k \leq |E|\}$ and the weights of edges $\{w_k | 1 \leq k \leq |E|\}$; and the source of vertex H.

Ensure: The span tree T and C:

| | |
|---|---|
| 1. | for all vertex v in the set of vertices do |
| 2. | if v is the source then |
| 3. | Let the cost (v) be 0. |
| 4. | else |
| 5. | let the cost(v) be ∞. |
| 6. | end if |
| 7. | Let predecessor(v) be null. |
| 8. | end for |
| 9. | for i from 1 to $|V| - 1$ do |
| 10. | for each edge $e_k$ in E do |
| 11. | Let u be the source vertex of e. Let v be the destination vertex of $e_k$. |
| 12. | if cost(v) is less than max($w_k$, cost(u)), then |
| 13. | Let cost(v)=max($w_k$, cost(u)). |
| 14. | Let predecessor(v) = u. |
| 15. | end if |
| 16. | end for |
| 17. | end for |
| 18. | Construct the span tree T using the predecessor(v) for all vertices. |

Algorithm 4 is a Revised Dijkstra Algorithm:

Given the graph G with the vertices $V=\{v_i|1\leq i\leq |V|\}$, the edges $E=\{e_k|1\leq k\leq |E|\}$ and the weights of edges $\{w_k|1\leq k\leq |E|\}$; and the source of vertex H.

Ensure: The span tree T and G:

| | |
|---|---|
| 1. | for all vertex v in the set of vertices do |
| 2. | if v is the source H then |
| 3. | Let the cost (v) be 0. |
| 4. | else |
| 5. | let the cost(v) be ∞. |
| 6. | end if |
| 7. | Let predecessor(v) be null. |
| 8. | end for |
| 9. | Let the set Q contain all vertices in V. |
| 10. | for Q is not empty do |
| 11. | Let u be vertex in Q with smallest cost. Remove u from Q. |
| 12. | if for each neighbor v of u do |
| 13. | Let e be the edge between u and v. Let alt = max(cost(u), weight(e)). |
| 14. | if alt<cost(v) then |
| 15. | cost(v)=alt |
| 16. | Let predecessor(v) be u. |
| 17. | end if |
| 18. | end for |
| 19. | end for |
| 20. | Construct the span tree T using the predecessor(v) for all vertices. |

GPS measurements are correlated through the latent vector of the position and velocity of a GPS receiver, which can be expressed as follows.

Let X be a six-dimension latent state vector consisting of the positions and velocities in ECEF coordinates. Let C be a satellite constellation including the positions and velocities of the satellites in ECEF coordinates, which can be determined by the ephemeris messages broadcasted by the satellites. Let a GPS measured quantity O include the code range, carrier phase and Doppler shift for the receiver from the satellites. As a result, the measurement equation can be written as;

$$O=h(X,\beta,\dot{\beta},C)+v \quad (6)$$

Where $\beta$ is the host receiver clock error, $\dot{\beta}$ is the change rate of $\beta$ and $v$ is the un-modeled noise for GPS measurements including biases caused by ionospheric and tropospheric refractions, satellite orbital errors, satellite clock drift, multi-path, etc.

Figure 7:
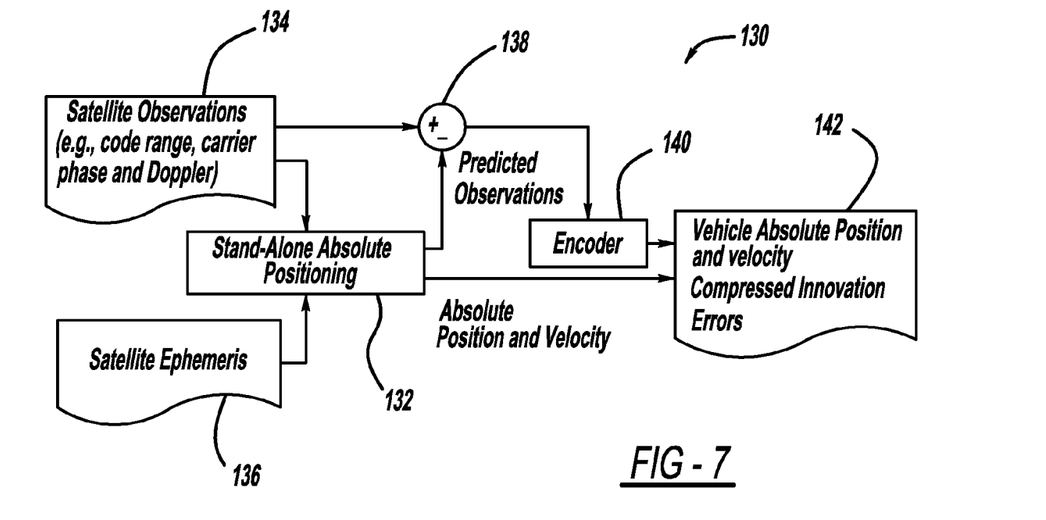
FIG. 7 is a block diagram of a system showing compression of GPS measurements.

FIG. 7 is a block diagram of a system 130 including a stand-alone absolute positioning module 132 receiving satellite observations at box 134 and satellite ephemeris at box 136. Prediction observations from the positioning module 132 and the satellite observations are provided to an adder 138 where the difference between the signals is encoded by an encoder 140. The encoded signals from the encoder 140 and the absolute positioning velocity signals from the positioning unit 132 are provided as vehicle absolute positioning and velocity signals and compressed innovation errors at box 142.

The stand-alone absolute positioning module 132 monitors the input of measurements including code range, carrier phase and Doppler shift, input of satellite constellation C, and vehicle data (e.g., wheel speed and yaw rate). The module 132 generates the absolute position and velocity of the GPS receiver $\hat{X}$. The module 132 also generates the predicted GPS measurements $\tilde{O}$ as expressed by a function h as:

$$\tilde{O}=h(\hat{X},C) \quad (7)$$

Therefore, the innovation error e can be defined as:

$$e=O-\tilde{O} \quad (8)$$

It can be verified that the innovation error vector has two properties. The components are mutually uncorrelated and for each component, the variance is much less than the counterpart of the GPS measurements O. Thus, standard data compression methods, such as, but not limited to, vector quantization or Huffman coding, can be applied to the innovation error e and achieves good compression performance.

Figure 8:
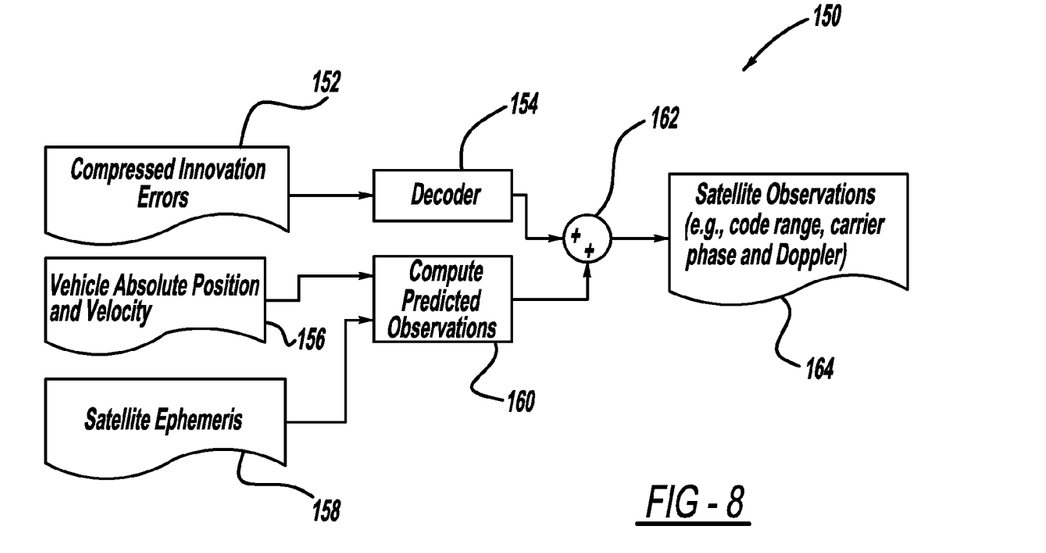
FIG. 8 is a block diagram showing a system for the decompression of GPS measurements.

FIG. 8 is a block diagram 150 illustrating the inversion operation of the compression module and shows the steps of how to recover the GPS measurements from the received compressed data from a wireless radio module. Particularly, compressed innovation errors at box 152 are provided to a decoder 154 and vehicle absolute position and velocity signals at box 156 and satellite ephemeris signals at box 158 are provided to a compute predicted observations module 160. The signals from the decoder 154 and the observations module 160 are added by an adder 162 to provide satellite observations, such as code range, carrier phase and Doppler frequencies at box 164.

Let the estimate of the absolute position and velocity of the GPS receiver be $\hat{X}$. The compressed innovation errors is decoded to obtain the corresponding innovation error e. One can verify that the predicted measurements $\tilde{O}$ can be computed from the estimate of the absolute position and velocity of the GPS receiver $\hat{X}$ and the satellite constellation C as:

$$\tilde{O}=h(\hat{X},C) \quad (9)$$

Thus, the recovered GPS measurements can be computed as:

$$\hat{O}=\tilde{O}+e \quad (10)$$

The GPS measurements are highly correlated with time. This makes them well suited to compression using a prediction model of the latent state vector X. Let the process equation of the latent state at time instant t be:

$$X(t+1)=f(X(t))+w \quad (11)$$

Where $f$ is the system process function of the host vehicle (e.g., constant velocity model, or constant turning model) where the GPS receiver is mounted on the roof of the vehicle and w is the un-modeled noise in the process equation.

The residuals w in equation (11) are well suited to compression by encoding the difference between the current state vector and the predicted state vector from the previous time instant.

Figure 9:
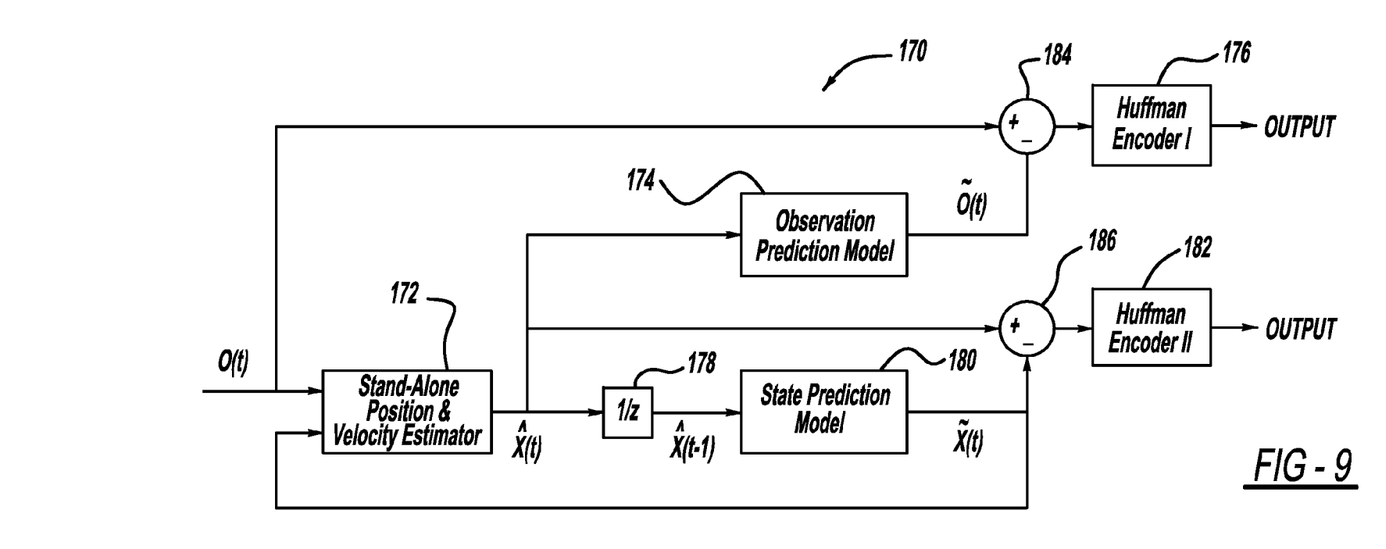
FIG. 9 is an overall block diagram of a proposed compression scheme.

FIG. 9 is a system 170 for a proposed compression scheme. A stand-alone position and velocity estimator 172 monitors the input of GPS measurements O(t) at time instant t and the prediction of the latent state vector $\tilde{X}(t)$ from the previous time t−1, and generates the new estimate of the latent state vector $\hat{X}(t)$. An observation prediction model module 174 calculates the observation prediction $\tilde{O}(t)$ using equation (6). A Huffman encoder I module 176 encodes the difference between the input O(t) and the model prediction $\tilde{O}(t)$ from an adder 184 using variable-length coding based on a derived Huffman tree. A unit delay module 178 stores the previous latent state vector $\hat{X}(t-1)$. A state prediction model 180 calculates the prediction of the latent state $\tilde{O}(t)$. A Huffman encoder II module 182 encodes the difference between the latent state vector $\hat{X}(t)$ and the model prediction $\tilde{X}(t)$ from an adder 186 using variable-length coding based on a Huffman tree.

Figure 10:
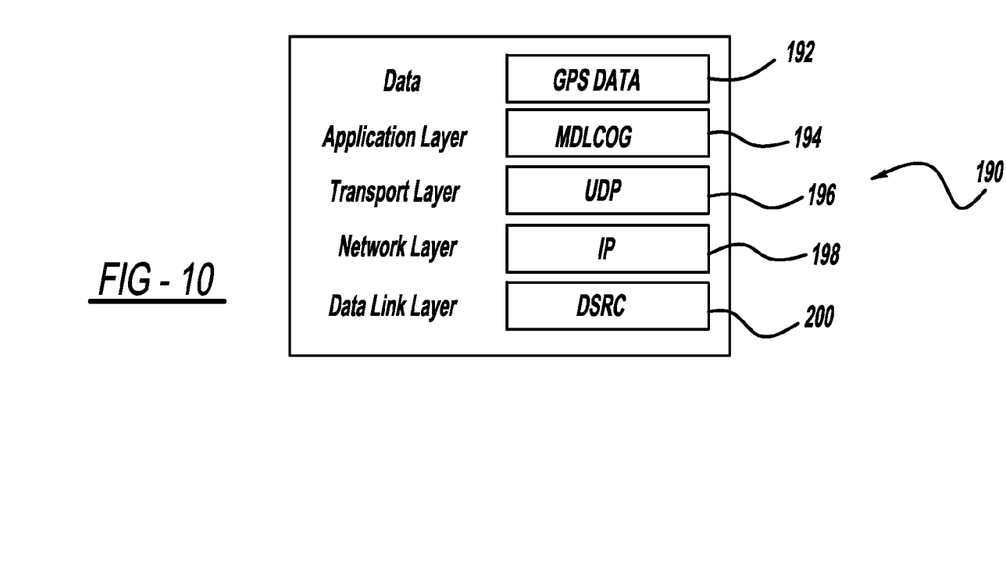
FIG. 10 is an illustration of a protocol stack.

The minimum description length compression of the GPS protocol (MDLCOG) is designed as an application layer provided above a transport layer, as shown in FIG. 10. Particularly, the MDLCOG is an application layer 194 in a protocol stack 190 positioned between a GPS data layer 192 and a transport layer 196. A network layer 198 is below the transport layer 196 and a data link layer 200 is at the bottom of the protocol stack 190.

The MDLCOG consists of a collection of messages, known as frames, used for initializing and transmission of measurements and additional data, such as GPS time stamp and a bitmap of the observed satellites. These data frames are known as an initialization frame (I-frame), an additional data frame (A-frame), a differential frame (D-frame) and a measurement frame (M-frame).

At the beginning of the data transmission, the encoder sends an I-frame to initialize the state prediction module at the decoder. The I-frame is analogous to the key frames used in video MPEG standards. The I-frame contains the absolute position and velocity of the GPS receiver in ECEF coordinates estimated by the encoder. The I-frame is also sent whenever the difference between the current and previous estimates of the latent state X is larger than a threshold.

The A-frame contains the non-measurement data, such as the satellite list, data quality indicators, etc. The A-frame is transmitted only at start-up and when the content changes.

The most frequently transmitted frames are the D-frame and the M-frame. D-frames are analogous to the P-picture frames used in MPEG video coding standards in the sense that they are coded with reference to previously coded samples. The time series difference in the D-frame use the vehicle dynamical model expressed in equation (11). Each D-frame contains the Huffman coded difference between the current and previous estimates of the latent state X. The M-frame contains the GPS time stamp and the Huffman coded difference between the measurements O and the predicted values Õ. The M-frame is sent whenever a new GPS measurement is received, and separate frames are transmitted for L1 and L2 frequencies for the M-frame.

Figure 11:
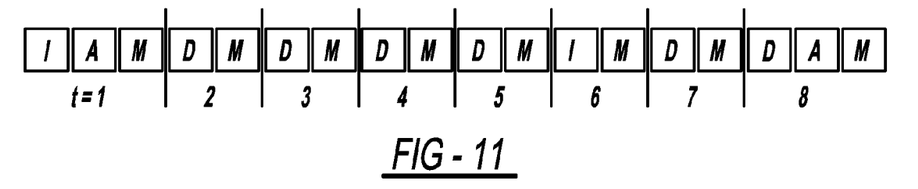
FIG. 11 is an example of a frame sequence.

Once the decoder has been initialized, having received the appropriate I-frames and A-frames, the encoder transmits the quantized prediction residual for each epoch in the corresponding D-frame and M-frame. An example of the sequence of frames is shown in FIG. 11. M-frames are sent in each time epoch. At time epoch 1, an I-frame and an A-frame are sent to initialize the prediction modules in the decoder. An I-frame is sent again in epoch 6 because the significant change in the latent state X estimate is detected. An A-frame is transmitted in epoch 8 since a satellite shows up at the horizon or a satellite sets down.

Figure 12:
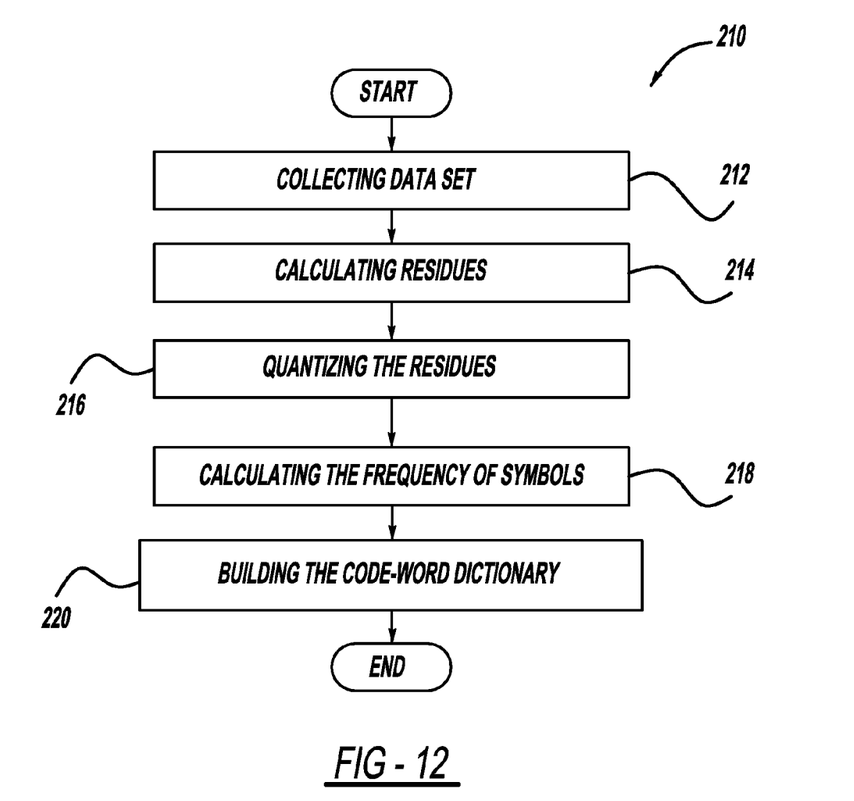
FIG. 12 is a flow chart diagram showing a process for building a Huffman codeword dictionary.

FIG. 12 is a flow chart diagram 210 that outlines the procedure for building a dictionary for coding the residuals. Extensive data of dual frequency GPS data is collected at box 212. At box 214, the ensemble of measurement residuals e or state prediction residuals w is calculated. At box 216, a specific resolution to quantize the residuals is chosen (e.g., 0.2 meter for pseudo-range as the RTCM protocol) and derives a list of symbols. At box 218, the frequency of each symbol in the ensemble is calculated. At box 220, $A=\{a_1, a_2, \ldots, a_n\}$ is set, which is the symbol alphabet of size n. Then, $P=\{p_1, p_2, \ldots, p_n\}$ is set, which is the set of the (positive) symbol frequency, i.e., $p_i$=frequency $(a_i)$, $1 \leq i \leq n$. A code C $(A,P)=\{c_1, c_2, \ldots, c_n\}$ is generated by building a Huffman tree, which is the set of (binary) code words, where $c_i$ is the codeword for $a_i$, $1 \leq i \leq n$.

Figure 13:
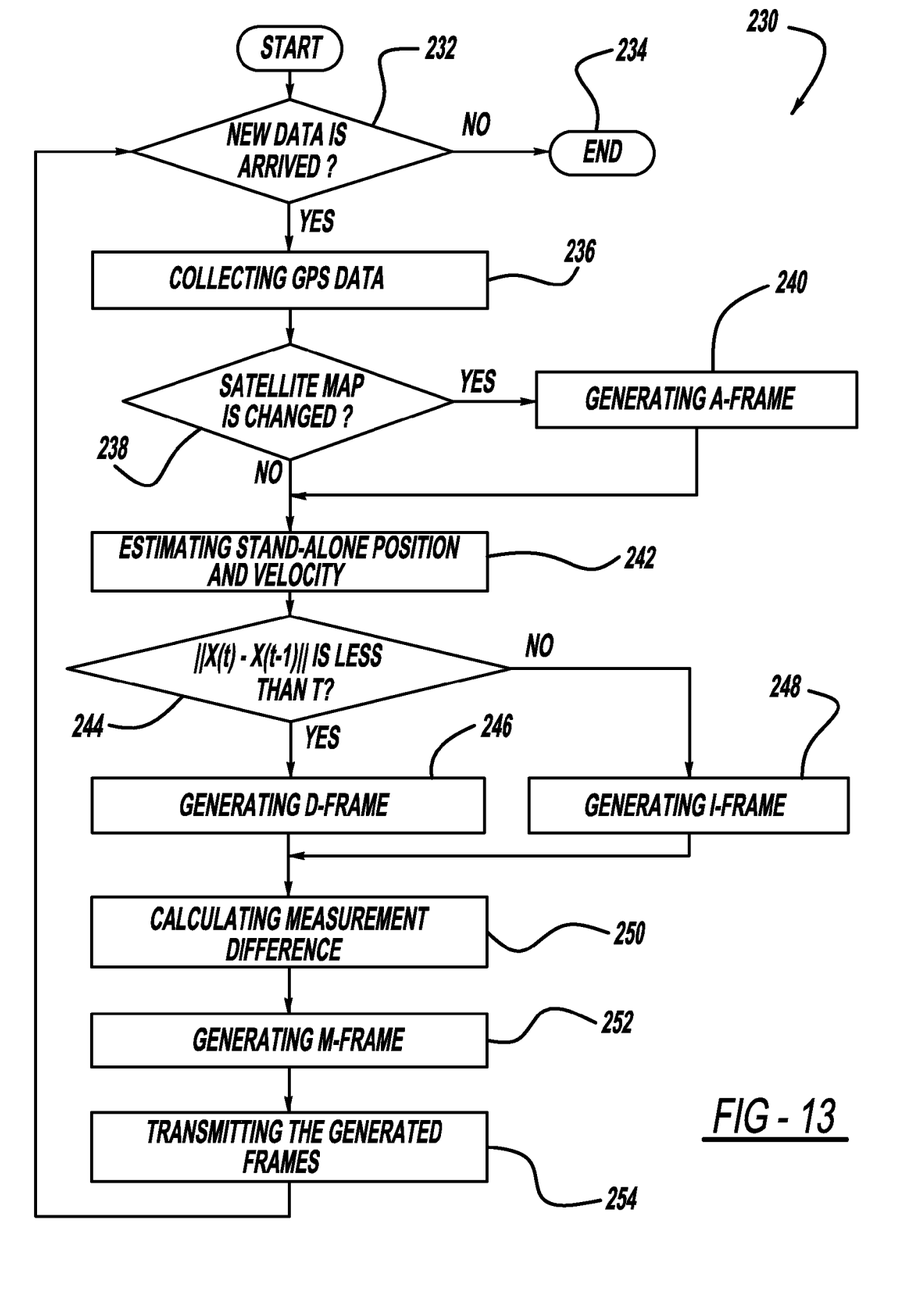
FIG. 13 is a flowchart diagram of an algorithm for encoding GPS data for transmission.

FIG. 13 is a flowchart diagram 230 of an algorithm for encoding GPS data. The procedure starts once new data from the GPS device is received at decision diamond 232, and ends if no data is received at box 234. Then, the GPS data O is collected at box 236 that consists of pseudo-range $R_j$, Doppler shift $D_j$ and carrier phase $\Phi_j$ from the j-th satellite $X_j$ that belongs to the set $C=\{X_j | 1 \leq j \leq J\}$, with J being the number of visible satellites. The value $X_j$ consists of the three-dimensional position of the j-th satellite in the ECEF coordinates.

The algorithm then determines if the satellite map has changed at decision diamond 238, and if so, the algorithm generates an A-frame at box 240. Particularly, if the identities, i.e., PRN, of the satellite constellation C are changed from the previous time instant, an A-frame is generated to encode the list of the observed satellite's PRN. The frame consists of a 32-bit map, where each bit is either true or false depending on the presence data for a particular satellite.

The algorithm then estimates the stand-alone position and velocity of the vehicle at box 242. In the estimating stand-alone position and velocity module, a Kalman filter is used to estimate the latent state vector X through a series of measurements O. Let the latent state vector $X=(x,y,z,\dot{x},\dot{y},\dot{z},\beta,\dot{\beta})$ denote the concatenated vector of a three-dimensional position vector in the ECEF coordinates, three-dimensional velocity vector in the ECEF coordinates, receiver clock error, and change rate of the receiver clock error, respectively. The linearized system of equation (6) at the neighborhood of X* can be written as:

$$X(t+1) = FX(t) + u_1 + w \qquad (12)$$

Where F is the Jacobian matrix with respect to the latent state vector X and the nonlinear term $u_1 = f(X^*) - FX^*$.

The measurements of equation (6) of the j-th satellite can be expanded into:

$$R_j = \rho_j + c\beta + v_R \qquad (13)$$
$$\lambda \Phi_j = \rho_j + c\beta + \lambda N_j + v_\Phi$$
$$-\frac{cD_j}{f} = \dot{\rho}_j + \frac{x_j - x}{\rho_j}\dot{x} + \frac{y_j - y}{\rho_j}\dot{y} + \frac{z_j - z}{\rho_j}\dot{z} + c\dot{\beta} + v_D$$

For $j=1, \ldots, J$, where $\rho^j$ is the geometrical range between the receiver and the j-th satellite $\dot{\rho}^j$ is the projection of the velocity vector of the j-th satellite projected onto the direction of from the receiver to the satellite, c denotes the speed of light, $\lambda$ and f are the wavelength and frequency of the carrier signal, respectively, $v_R, v_\Phi$ and $v_D$ are the un-modeled measurement noise for pseudo-range, carrier phase and Doppler shift, respectively, and $x_j, y_j$ and $z_j$ are the three-dimensional position of the j-th satellite in the ECEF coordinates.

Note that the quantities $\rho^j$ and $\dot{\rho}^j$ depend on the vector of the latent state vector X. In other words, equation (13) includes nonlinear equations in terms of the latent state vector X. These quantities are not very sensitive to changes in the latent state vector X. With the receiver's dynamic available, it is usually sufficient to use the predicted estimate $\tilde{X}$ of previous time instant as the center of the linearized neighborhood X* and use it to replace the latent state vector X in equation (13). Therefore, when $R_j$, $\Phi_j$ and $D_j$ are available, a better estimate of the latent state vector X can be obtained by the filtering method described in Algorithm 5 detailed below.

Equation (13) can be linearized in the neighborhood of X* as:

$$O_j = H_j X + u_{2_j} + v_j \qquad (14)$$

Where $O_j = [R_j, \Phi_j, D_j]^T$, $H_j$ is the Jacobian of equation (13) matrix with respect to the latent state vector X and the nonlinear term $u_{2j}=h(X^*)-H_jX^*$. Therefore, the key steps of the estimating stand-alone position and velocity module can be outlined in Algorithm 5.

The algorithm then determines whether the current state estimate X(t) and the previous state estimate X(t−1) is larger than a threshold T at decision diamond 244. If the difference between the current state estimate X(t) and the previous state estimate X(t−1) is larger than the threshold T, an I-frame is generated at box 248. The I-frame encodes the current state estimate X(t), including the ECEF position and velocity of the receiver. Otherwise a D-frame is generated to encode the difference X(t)−X(t−1) using Huffman codeword dictionary at box 246.

The next step is to calculate the model residuals at box 250 for the measurements as:

$$e = O - h(X) \qquad (15)$$

Then, the measurement model residuals are encoded using the Huffman codeword dictionary by generating the M-frame at box 252. In the last step at box 254, all generated frames are transmitted to the lower UDP layer 196.

Algorithm 5, Absolute Positioning Update:

Given the previous estimate of the latent state $\hat{X}(t-1)$ with its covariance matrix $\hat{P}(t-1)$; measurements O(t); GPS time stamp of the receiver $t_R$; satellite ephemerides E; the system dynamical equation (4); measurement equation (6); covariance matrix Q of the noise term w in equation (4); covariance matrix R of the noise term v in equation (6).

The updated estimate of the absolute position and velocity of the receiver $\hat{X}(t)$ at time t.

---

1. Compute the prediction $\tilde{X} = f(\hat{X}(t-1))$ and $\tilde{P} = F\hat{P}(t-1)F^T + Q$.
2. for all j, $1 \le j \le J$ do
3. Retrieve the satellite ephemeris of the j-th satellite.
4. Compute the ECEF position $X_j = [x_j, y_j, z_j]^T$ and velocity $\dot{X}_j = [\dot{x}_j, \dot{y}_j, \dot{z}_j]^T$ of the j-th satellite.

5. Compute $\rho_j = \sqrt{(x_j - \tilde{x})^2 + (y_j - \tilde{y})^2 + (z_j - \tilde{z})^2}$ and $\dot{\rho}_j = \dot{X}_j^T (X_j - \tilde{X})$ with $\tilde{X} = [\tilde{x}, \tilde{y}, \tilde{z}]^T$ being the prediction of ECEF position of the receiver.
6. Compute $H_j$ using equation (7):

$$H_j = \begin{bmatrix} -\frac{x_j-\tilde{x}}{\rho_j} & -\frac{y_j-\tilde{y}}{\rho_j} & -\frac{z_j-\tilde{z}}{\rho_j} & 0 & 0 & 0 & c & 0 \\ -\frac{x_j-\tilde{x}}{\rho_j} & -\frac{y_j-\tilde{y}}{\rho_j} & -\frac{z_j-\tilde{z}}{\rho_j} & 0 & 0 & 0 & c & 0 \\ 0 & 0 & 0 & \frac{x_j-\tilde{x}}{\rho_j} & \frac{y_j-\tilde{y}}{\rho_j} & \frac{z_j-\tilde{z}}{\rho_j} & 0 & c \end{bmatrix}$$

7. end for
8. Compute $H = [H_1^T, \ldots, H_J^T]^T$.
9. Compute innovation error using equation (5), i.e., $e = O(t) - h(\tilde{X})$
10. Compute innovation covariance $S = H\tilde{P}H^T + R$.
11. Compute Kalman gain $K = \tilde{P}H^T S^{-1}$.
12. Output the updated estimate $\hat{X} = \tilde{X} + Ke$ and the covariance matrix $\hat{P} = (I - KH)\tilde{P}$.

---

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the relative position and velocity between a host vehicle and a plurality of other vehicles, said method comprising:

receiving GPS information concerning the position of the other vehicles by the host vehicle;

building a weighted graph of the vehicles that define weighted baselines between each of the vehicles and the host vehicle and each of the other vehicles, where the weighted baselines define a geometric dilution of precision between the vehicles, wherein determining the geometric dilution of precision depends on the number of shared satellites and a constellation of common satellites for the baseline;

determining an optimal baseline between the host vehicle and each of the other vehicles using the weighted baseline, where the optimal baseline is a lowest geometric dilution of precision; and computing the relative position and velocity between all of the vehicles and the host vehicle using the optimal baselines.

2. The method according to claim 1 wherein building the weighted graph includes using a single baseline precision positioning algorithm.

3. The method according to claim 1 wherein building the weighted graph includes using a precise relative positioning for multiple vehicles algorithm.

4. The method according to claim 3 wherein the precise relative positioning for multiple vehicles algorithm employs a Bellman-Ford algorithm.

5. The method according to claim 3 wherein the precise relative positioning for multiple vehicles algorithm employs a Dijkstra algorithm.

6. The method according to claim 1 wherein determining the optimal baseline includes employing a state tracking filter that estimates three position and three velocity components.

7. The method according to claim 6 wherein the state tracking filter receives a stand-alone position of each vehicle, satellite ephemeris signals and double differences of GPS observation signals.

8. The method according to claim 1 where receiving GPS information includes receiving satellite ephemeris, code range, carrier phase and Doppler frequency shift observation information.

9. The method according to claim 1 wherein determining an optimal baseline between the host vehicle and each of the other vehicles includes determining that the optimal baseline is not a direct baseline from the host vehicle to the other vehicle, but is a baseline through one or more vehicles.

10. A method for determining the relative position and velocity between a host vehicle and a plurality of other vehicles, said method comprising:

receiving GPS information concerning the position of the other vehicles by the host vehicle including satellite ephemeris, code range, carrier phase and Doppler frequency shift observation information;

building a weighted graph of the vehicles that define weighted baselines between each of the vehicles and the host vehicle and each of the other vehicles, where the weighted baselines define a geometric dilution of precision between the vehicles, wherein determining the geometric dilution of precision depends on the number of shared satellites and a constellation of common satellites for the baseline;

determining an optimal baseline between the host vehicle and each of the other vehicles using the weighted baselines, where the optimal baseline is the lowest geometric dilution of precision; and computing the relative position and velocity between all of the vehicles and the host vehicle using the optimal baselines.

11. The method according to claim 10 wherein building the weighted graph includes using a single baseline precision positioning algorithm or a precise relative positioning for multiple vehicles algorithm.

12. The method according to claim 10 wherein determining the optimal baseline includes employing a state tracking filter that estimates three position and three velocity components.

13. The method according to claim 10 wherein the state tracking filter receives a stand-alone position of each vehicle, satellite ephemeris signals and double differences of GPS observation signals.

14. The method according to claim 10 wherein determining an optimal baseline between the host vehicle and each of the other vehicles includes determining that the optimal baseline is not a direct baseline from the host vehicle to the other vehicle, but is a baseline through one or more vehicles.

15. A system for determining the relative position and velocity between the host vehicle and a plurality of other vehicles, said system comprising:

means for receiving GPS information concerning the position of the vehicles by the host vehicle;

means for building a weighted graph of the vehicles that defines weighted baselines between each of the vehicles and the host vehicle and each of the other vehicles, where the weighted baselines define a geometric dilution of precision between the vehicles, wherein the geometric dilution of precision depends on the number of shared satellites and a constellation of common satellites for the baseline;

means for determining an optimal baseline between the host vehicle and each of the other vehicles using the weighted baselines, where the optimal baseline is the lowest geometric dilution of precision; and means for computing the relative position and velocity between all of the vehicles and the host vehicle using the optimal baseline.

16. The system according to claim 15 wherein the means for building a weighted graph uses a single baseline precision positioning algorithm or a precise relative positioning for multiple vehicles algorithm.

17. The system according to claim 15 wherein the means for determining the optimal baseline employs a state tracking filter that estimates three position and three velocity components.

18. The system according to claim 17 wherein the state tracking filter receives a stand-alone position of each vehicle, satellite ephemeris signals and double differences of GPS observation signals.

19. The system according to claim 15 wherein the means for determining optimal baseline between the host vehicle and each of the other vehicles determines that the optimal baseline is not a direct baseline from the host vehicle to the other vehicle, but is a baseline through one or more vehicles.

20. The method according to claim 10 further comprising sending the relative position and velocity between all of the vehicles and the host vehicle to a vehicle safety application.

* * * * *